United States Patent [19]

Schoeller

[11] Patent Number: 5,411,234
[45] Date of Patent: May 2, 1995

[54] STAND FOR THE STORAGE OF TWO-DIMENSIONAL WORKPIECES

[75] Inventor: Heinz Schoeller, Mengen, Germany

[73] Assignee: Croon & Lucke Maschinenfabrik GmbH, Mengen, Germany

[21] Appl. No.: 20,349

[22] Filed: Feb. 22, 1993

[30] Foreign Application Priority Data

Mar. 24, 1992 [DE] Germany .......................... 9203901 U

[51] Int. Cl.⁶ .............................................. A47B 95/00
[52] U.S. Cl. ................................ 248/345.1; 254/89 H; 187/213
[58] Field of Search ................ 211/107, 150; 248/174, 248/127, 157, 176, 121, 122, 124, 125, 352, 188.5, 677, 354.1, 650, 345.1; 254/89 H, 89 R; 187/205, 214, 213

[56] References Cited

U.S. PATENT DOCUMENTS

| | | | |
|---|---|---|---|
| 2,676,486 | 4/1954 | Lazan | 248/121 |
| 2,837,787 | 6/1958 | Wright | 248/345.1 X |
| 2,991,034 | 7/1961 | Lyon | 248/121 |
| 3,327,997 | 6/1967 | Zenke | 254/89 R |
| 3,413,813 | 12/1968 | Rock et al. | 248/354.1 X |
| 3,802,658 | 4/1974 | Binding | 248/352 |
| 3,881,687 | 5/1975 | Johansson | 254/89 H X |
| 4,113,110 | 9/1978 | Mittag | 248/345.1 X |
| 4,200,195 | 4/1980 | Hager | 211/150 X |
| 4,241,901 | 12/1980 | Shircliffe | 254/89 H |
| 4,572,382 | 2/1986 | Niederprum | 211/150 |
| 4,601,141 | 7/1986 | Donnelly | 254/89 H X |
| 4,638,886 | 1/1987 | Marietta | 254/89 H X |
| 5,217,121 | 6/1993 | Walker | 211/41 |

FOREIGN PATENT DOCUMENTS

| | | | |
|---|---|---|---|
| 2643719 | 4/1977 | Germany | 254/89 R |
| 3811310 | 10/1989 | Germany . | |
| 4020864 | 1/1992 | Germany . | |

*Primary Examiner*—Ramon O. Ramirez
*Assistant Examiner*—Korie H. Chan
*Attorney, Agent, or Firm*—Bachman & LaPointe

[57] ABSTRACT

A stand for the storage of two-dimensional workpieces, as parts of an automobile which are manufactured by presses, made up of individual stacking columns exhibiting movable jacks which are disposed in a stacking profile. The stacking profile is detachably connected to a protective profile.

13 Claims, 6 Drawing Sheets

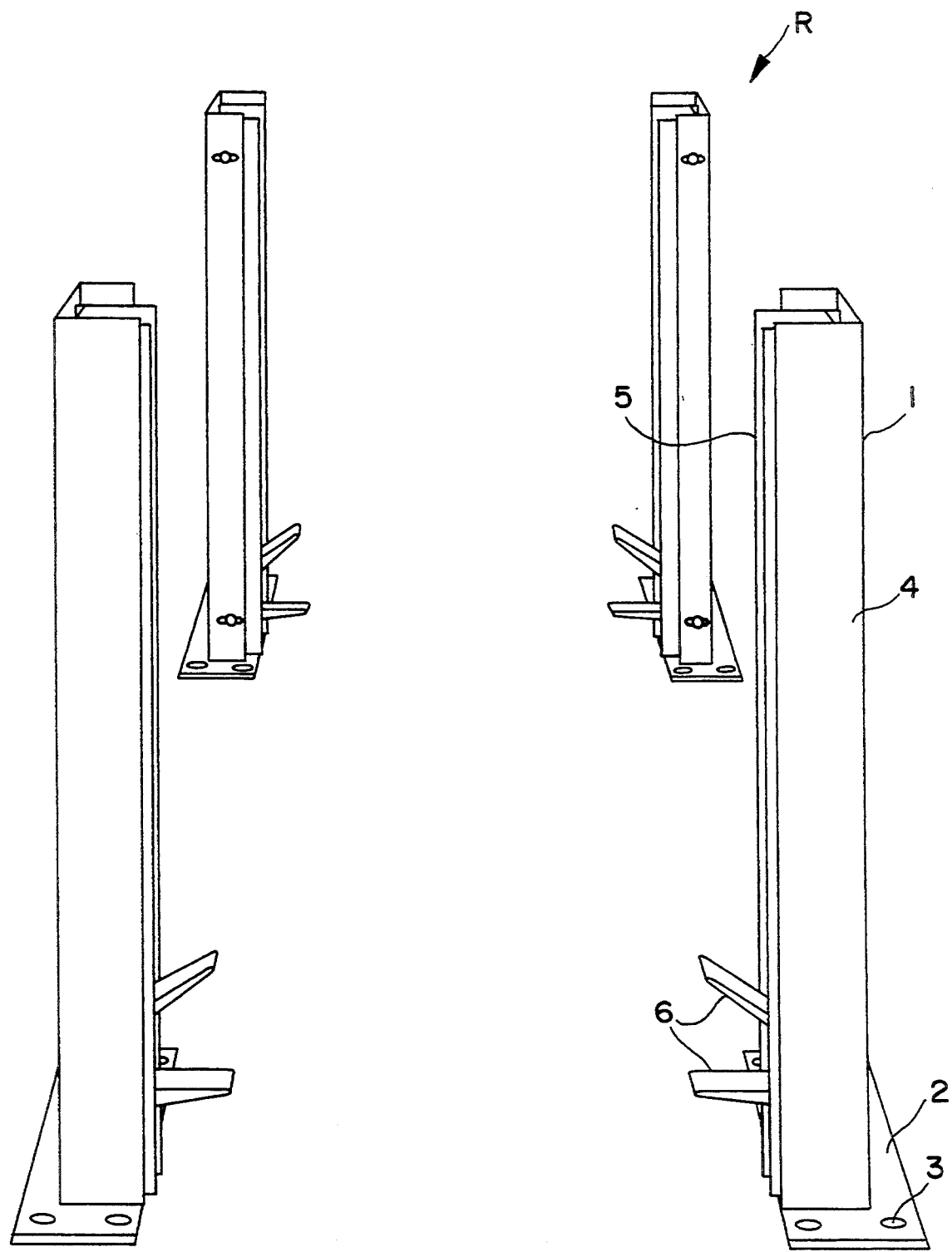
F I G. 1

STAND FOR THE STORAGE OF TWO-DIMENSIONAL WORKPIECES

BACKGROUND OF THE INVENTION

The invention relates to a stand for the storage of two-dimensional workpieces, for example of parts of an automobile which are manufactured by presses, made up of individual stacking columns exhibiting movable Jacks which are disposed in a stacking profile.

Stands of this type are known, for example, from German Offenlegungsschrift 38 11 310 or from German Offenlegungsschrift 40 20 864. An important feature of these stands is that, as a result of the insertion of a two-dimensional workpiece, the succeeding jack is simultaneously brought into a position in which it is able to receive the next workpiece. These stands are used for a very large number of parts, of an automobile for example. Trunk lids, engine hoods, side panels, roof parts, other chassis parts etc. are stored.

The stacking columns for a stand of this type should, on the one hand, be of very stable construction, since they are frequently run up against, by stacker trucks for example. However, they must additionally exhibit a constant vertical alignment and a constant distance apart to enable parts to be stored to be received properly on the jacks. For this reason, the on-the-spot construction of such a stand is very difficult and time-consuming, since the individual stacking columns have to be precisely aligned. A deviation measured in millimeters when mounting the stand onto an underbase gives rise to a deviation measured in centimeters in the upper part of the stacking columns. A particularly important feature is the inclination to one another of stacking columns facing one another with their jacks. The construction of a stand of this type generally requires just as much time as it takes to manufacture the stand as a whole.

SUMMARY OF THE INVENTION

The object of the present invention is to remedy these disadvantages and, in particular, to provide a stand which is simple to erect and align and which is resistant to damage.

This object is achieved by the fact that the stacking profile is detachably connected to a protective profile.

In this way, the actual stacking profile is no longer exposed to an attack by, for example, a stacker truck, but is protected by a protective profile. In addition, the said stacking profile is variable in terms of its situation in relation to the protective profile, so that, following the securement of the protective profile on an underbase, an adjustment can be made which is very simple to effect.

Preferably, the protective profile is of angular or U-shaped configuration, the stacking profile being encased by the said U-profile, i.e. the stacking profile is seated in the protective profile. The encasement is effected in the direction of the outer side of the stand, since here, in particular, collision by stacker trucks frequently occurs.

Preferably, this protective profile can now consist of relatively thick material which is molded into a corresponding profile. The choice of a thicker material for the stacking profile was not available in the past, since a plurality of holes for the reception of jack axles or the like had to be formed into this stacking profile. This was generally done by a punching-out operation in a single work cycle. If a thicker sheet-metal had been chosen for the stacking profile, then the manufacture of such holes would only have been possible by virtue of a plurality of drilling operations, which is very time-consuming and cost-intensive.

According to the present invention, a relatively thin material or a thin sheet-metal can be chosen for the actual stacking profile, whilst the actual protective profile is of very thick-walled configuration and hence forms a good protection.

Preferably, the protective profile comprises an angle profile having a leg pointing toward the outer side of the stand and a rear wall. These two parts must be of thick-walled configuration, since they are exposed to attack from outside. In order to complete the U-shaped profile, there is placed against this angle profile, parallel to the aforementioned leg, a sheet-metal strip, which can once again be of relatively thin configuration since it is situated in the stand and is not therefore exposed to attack from outside. Savings on materials can thereby be made. Additional material is then further saved in relation to the stacking profile itself, so that, overall, the additional material expenditure for the protective profile is relatively small. Moreover, this expenditure is more than offset by the cost savings made for the manufacture of the stacking profile, since all openings of the stacking profile can now be produced by stamping.

Preferably, the stacking profile is detachably fastened to the aforementioned sheet-metal strips. The detachable fastening has the effect of enabling the stacking profile to be tilted in relation to the protective profile. The fastening is also designed accordingly. A number of variations are here conceivable and are to be covered by the present inventive concept. For example, a longhole can be formed into the sheet-metal strip, the connection of the stacking profile and the protective profile being made via a screw bolt which slides in this longhole, the longhole running approximately horizontally. This enables opposite stacking profiles to be precisely adjusted in terms of their distance apart. A jack interval is then constant from top to bottom within a stand. The adjustment is made in a very simple manner by an appropriate spirit level merely being placed against the stacking profile and this stacking profile being located precisely in the bubble.

In one illustrative embodiment, a single longhole with screw bolts can suffice, whilst the stacking profile is secured, on the other hand, by a swivel joint. Preferably, however, a longhole is respectively located at least at the top and bottom in the protective profile, so that the distance also between two stacking profiles can be varied.

It is also of course possible for the longhole to be located in the stacking profile. In addition, other more complex fastening options are also conceivable, by which the situation of the stacking profile can be varied in relation to the protective profile.

A fundamental advantage of this arrangement is also that the stacking profile in the protective profile can be exchanged. If, for example, a different jack interval is required, then it is possible to exchange a stacking column having this jack interval for the just used stacking column, without any change having to be made to the protective profile.

Preferably, the protective profile is seated on a baseplate and is secured thereon. This baseplate is then roughly levelled for the manufacture of the stand, the exact relative adjustment of the stacking profiles being effected however by loosening the connection between the stacking profile and the protective profile and by tilting the stacking profile in relation to the protective profile.

Further advantages, features and details of the invention can be derived from the following description of preferred illustrative embodiments and with reference to the drawing, in which:

BRIEF DESCRIPTION OF THE DRAWINGS

FIG. 1 shows a perspective view of a stand according to the invention for the storage of two-dimensionally shaped workpieces;

DESCRIPTION OF THE PREFERRED EMBODIMENTS

Figure 6:
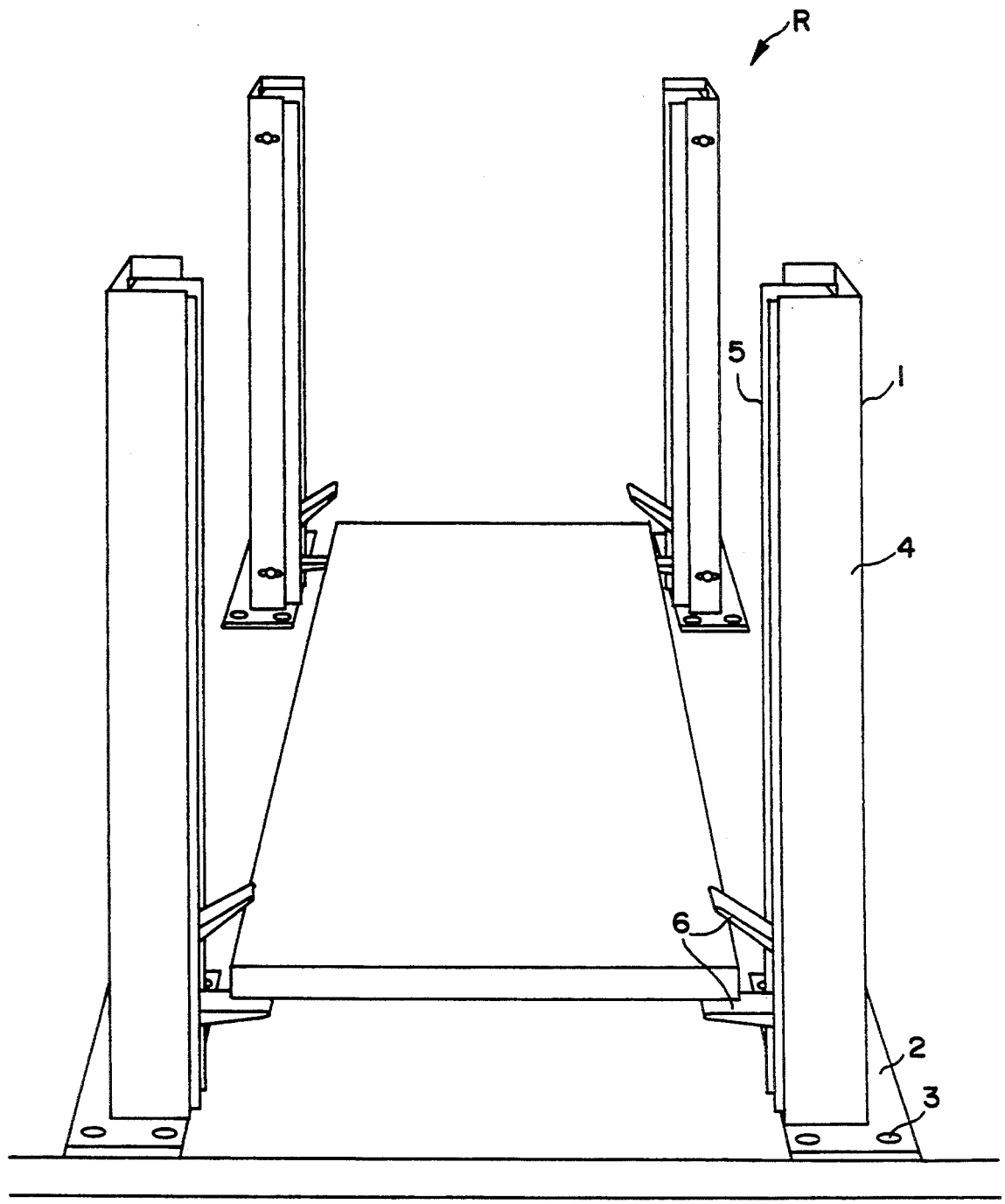
FIG. 6 shows four stacking columns used together for holding a workpiece.

A stand R for the storage of, in particular, two-dimensionally shaped workpieces, such as, for example, automobile parts, exhibits according to FIG. 1 and 6, in the present illustrative embodiment, four stacking columns 1. Each stacking column 1 is provided with a baseplate 2, which possesses bores 3 for securement on an underbase, supporting plate, supporting profile or the like.

Figure 2:
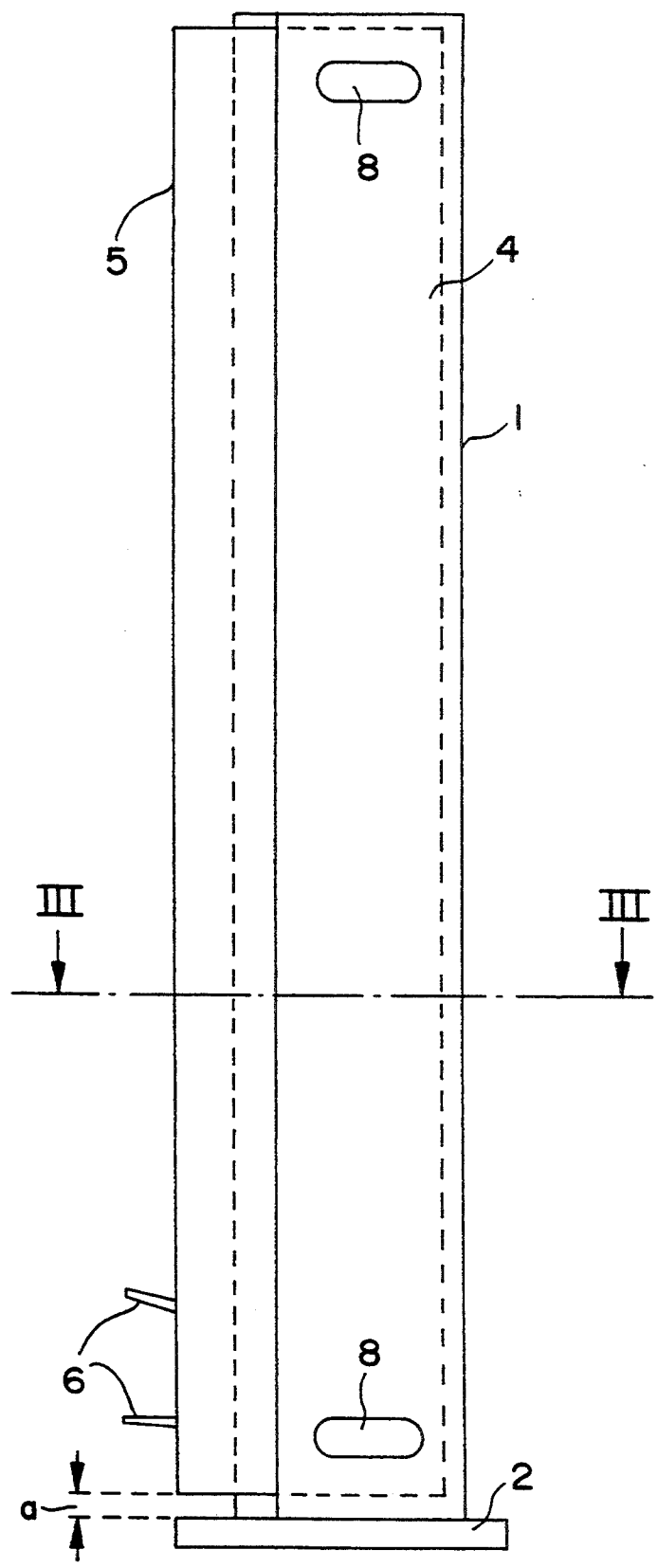
FIG. 2 shows a side view of a stacking column according to the invention for a stand according to FIG. 1.
Figure 4:
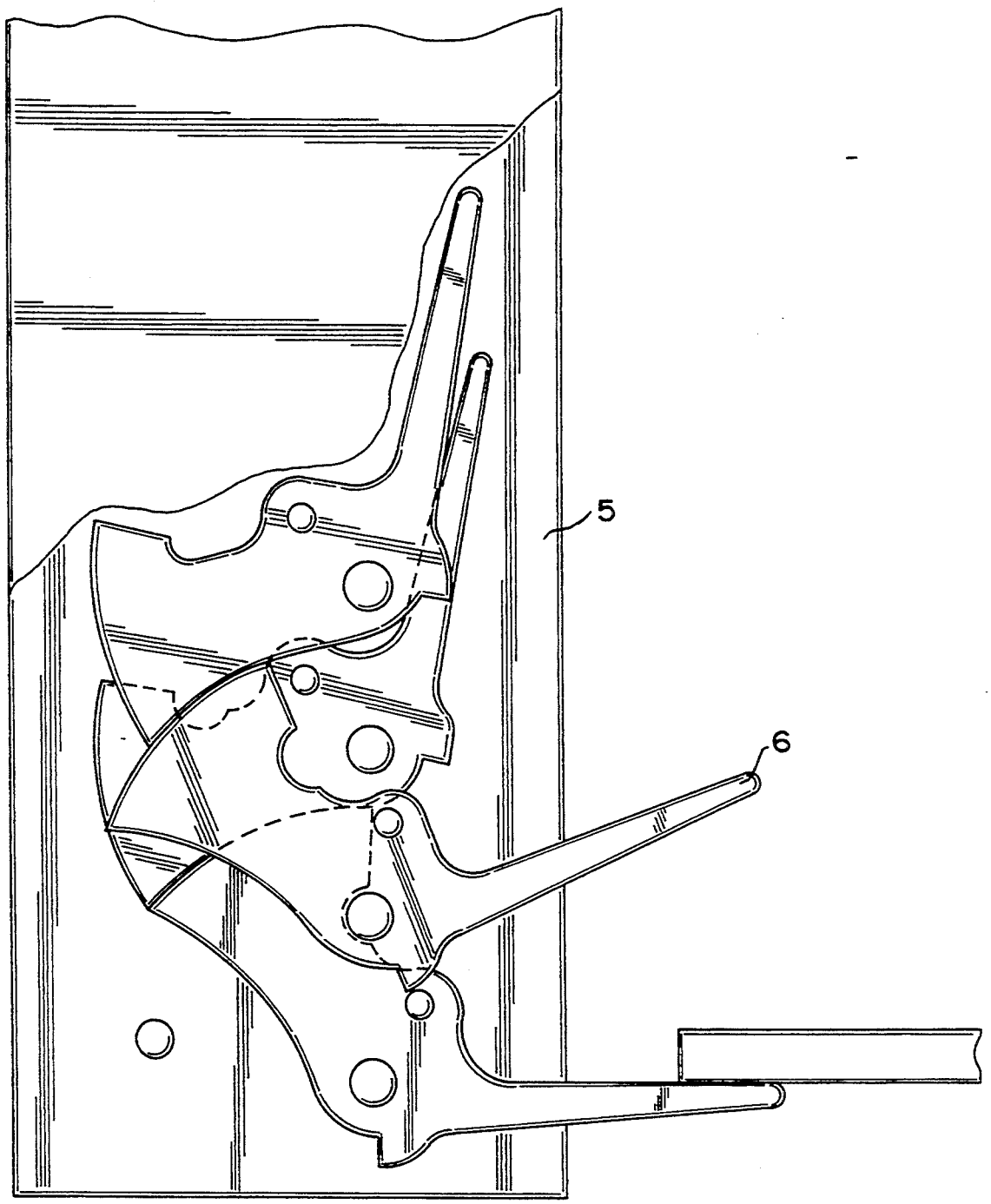
FIG. 4 shows a side elevational view of jacks used in the stacking columns with a workpiece thereon.
Figure 5:
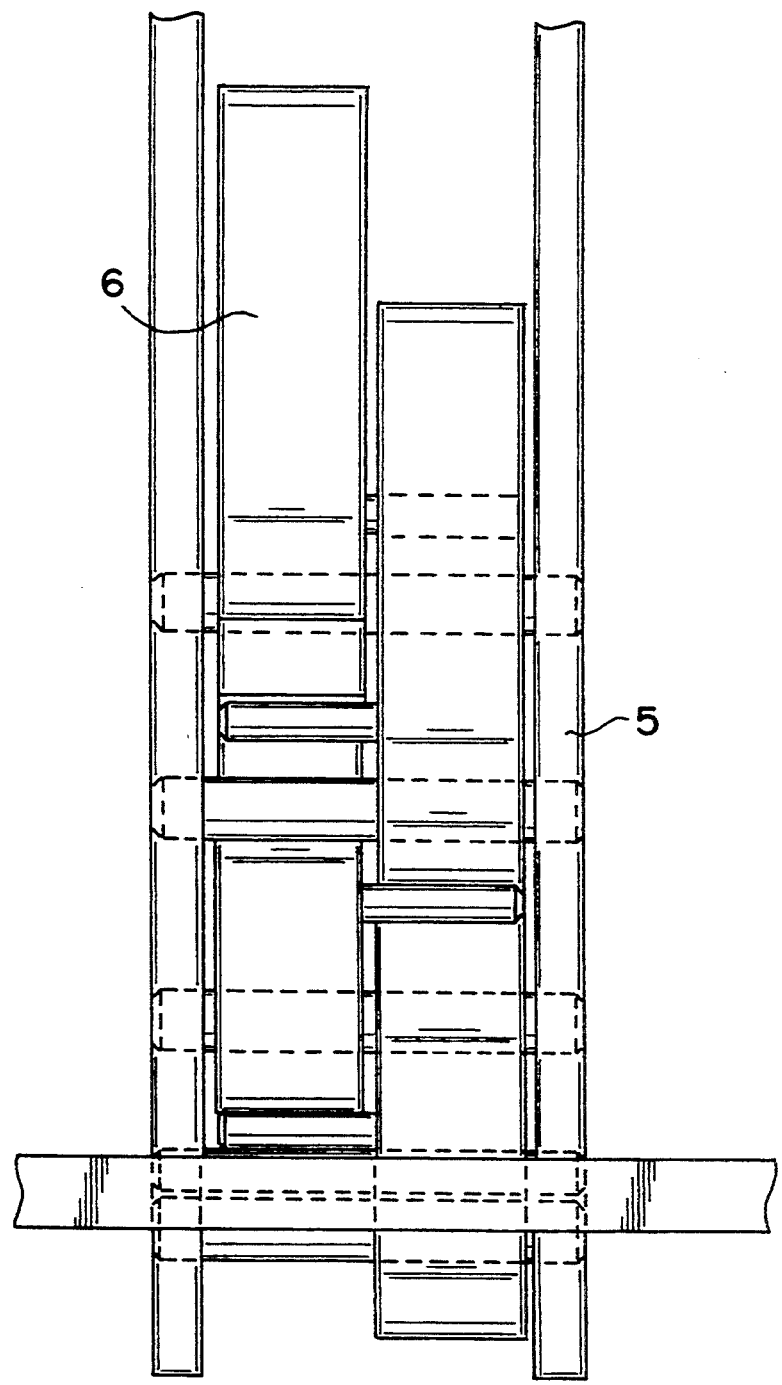
FIG. 5 shows a front elevational view of the jacks used in the stacking column having a workpiece thereon.

On the baseplate 2 there is located, according to the invention, a protective profile 4, which generally ought to be connected to the baseplate 2 by means of weld seams. In this protective profile 4 there is disposed an actual stacking profile 5, in which there are also located pivotally bolted jacks 6, such as shown in FIGS. 4 and 5, for holding the two-dimensionally shaped workpieces on column 1, these Jacks 6 being described, for example, in German Offenlegungsschrift 40 20 864 and such description is incorporated herein by reference to its U.S. counterpart Pat. No. 5,217,121 to Walker, assigned to the assignee of the present application. The latches (9) disclosed therein are the substantially the same as the jacks (6) of the instant invention. The actual attachment of the latches (9) to the rail (4) is directly analogous to the attachment of the jacks (6) to the stacking profile (5) of the instant invention. According to FIG. 2, it can be seen that the stacking profile 5 exhibits from the baseplate 2 a distance a, but this does not have to be the case. It is also conceivable for the stacking profile 5 simply to stand erect on the baseplate 2. In any event, the stacking profile 5 is not however connected to the baseplate 2. Further, the functionality of the latches (9) as described, is the same as the functionality of the jacks (6). The description, therefore, in Walker, is directly applicable to the workpiece stand described herein, and is incorporated.

Figure 3:
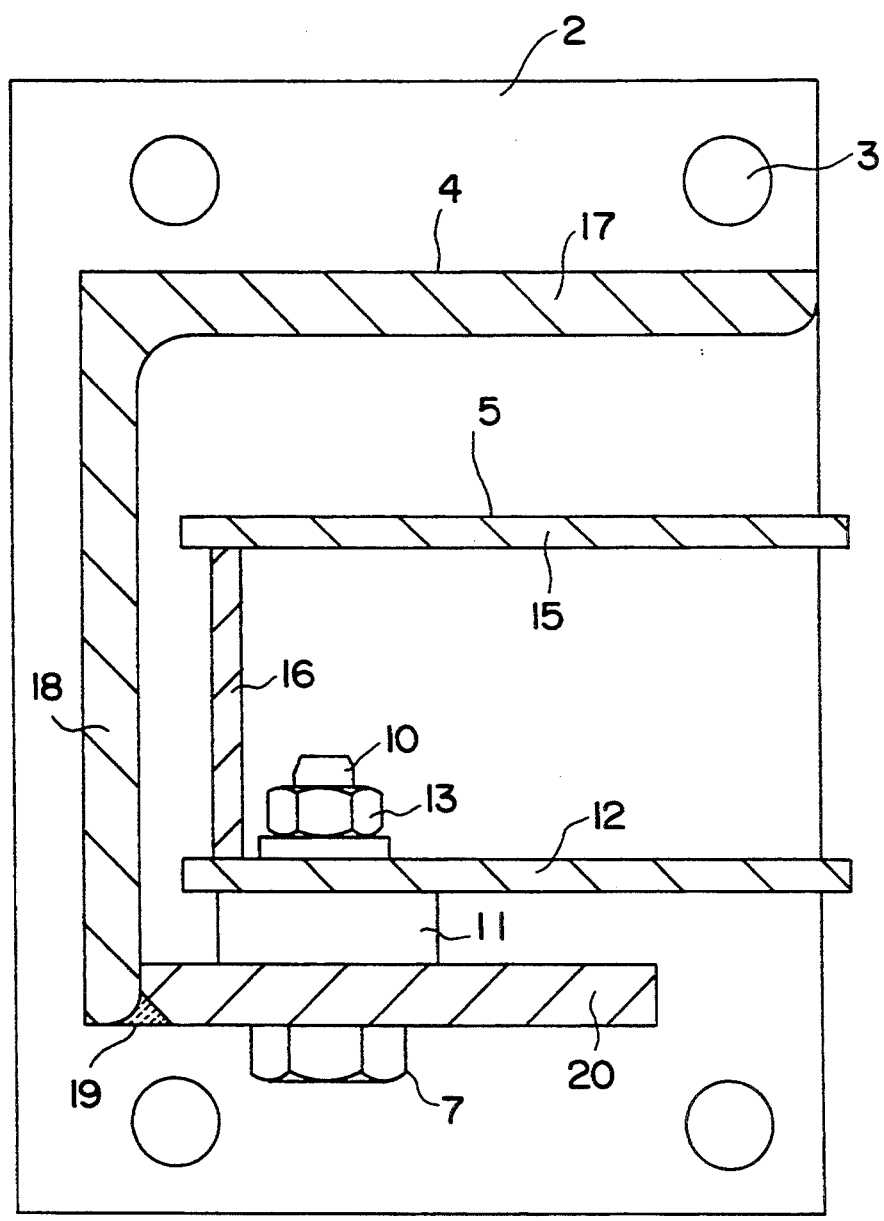
FIG. 3 shows a cross section through the stacking column according to FIG. 2 along the line III—III.

By contrast, the stacking profile 5 exhibits a detachable connection to the protective profile 4. This detachable connection is effected, in the illustrative embodiment according to FIGS. 2 and 3, by means of a screw bolt 7, which passes through a longhole 8 in the protective profile 4. In this case, a screwhead 9 butts from outside against the protective profile 4, whilst a threaded section 10 traverses the longhole 8, then passes through a distancing sleeve 11 and a side wall 12 of the stacking profile 5 and is secured, on the other side, by means of a nut 13 which presses onto a washer 14.

Since this arrangement, in respect of a stacking column, is provided both at the top and also close to the baseplate 2, a readjustment of the stacking profile 5 in relation to the protective profile 4 can be made. This is done by loosening the corresponding screw connection, the stacking profile 5, following the loosening of the screw connection, being able to be tilted further or less in relation to the protective profile 4.

The stacking profile 5 additionally comprises, in known manner, two side walls 12 and 15, which run approximately in parallel and are interconnected by a rear wall 16. A U-shaped profile is thereby formed, between which the abovementioned jacks 6 are able to move.

The protective profile 4 preferably exhibits a vertically disposed angle profile made up of a leg 17 and a rear wall 18. Approximately parallel to the leg 17, there is secured to the rear wall 18, by a weld seam 19, a sheet-metal strip 20, to which the stacking profile 5 is secured by the abovementioned screw connection.

I claim:

1. A stand for the storage of workpieces, comprised of individual stacking columns wherein each column includes a movable jack, a stacking profile having a length and at least interconnecting walls extending said length, and a protective profile securely attached to a base, wherein said base is adapted to be secured to a support surface, said movable jack disposed in and attached to said stacking profile and said stacking profile detachably connected to said protective profile such that said stacking profile is unattached at a lowermost surface thereof to said base and is adapted to be interchanged with other stacking profiles to accommodate different workpieces while said protective profile and said base are adapted to remain stationary, wherein said protective profile shields said at least two interconnecting walls from contact along a substantial portion of the length of said walls.

2. The stand as claimed in claim 1, wherein said protective profile is of a U-shape configuration and said stacking profile is detachably inserted into said U-shape configuration of said protective profile.

3. The stand as claimed in claim 2, wherein said stacking profile said includes two side walls and a back wall, and said protective profile includes two side walls and a back wall, wherein said stacking profile is positioned in said protective profile such that said back wall of said stacking profile is parallel and adjacent to said back wall of said protective profile.

4. The stand as claimed in claim 1, wherein the protective profile comprises an angle profile having a leg which points toward the at least two interconnecting walls of the stand and a rear wall.

5. The stand as claimed in claim 4, wherein said protective profile further comprises a sheet metal strip running approximately parallel to said leg, said stacking profile being detachably secured to said sheet metal strip.

6. The stand as claimed in claim 5, wherein said sheet metal strip has at least one long hole located therein, said long hole being passed through by a screw bolt which detachably secures said stacking profile to said protective profile.

7. The stand as claimed in claim 6, further including a distancing sleeve positioned between said protective profile and said stacking profile, said screw bolt passing through said distancing sleeve.

8. The stand as claimed in claim 5, wherein said sheet metal strip includes two long holes therein located a distance apart, said long holes being traversed by screw bolts.

9. The stand as claimed in claim 1, wherein the protective profile is non-movably secured on a base plate and said stacking profile is movable in relation to said base plate.

10. A stand as claimed in claim 1, wherein each of said columns is positioned relative to the other columns such that said movable jack of each of said columns faces a movable jack of at least one other column.

11. The stand as claimed in claim 10, including four of said columns secured to said support surface, said columns arranged in a substantially rectangular manner such that the movable jack of one column faces the movable jack of one other column.

12. A stand for the storage of work pieces, comprising:

individual stacking columns wherein each column includes a stacking profile, a protective profile, and a movable jack attached to said stacking profile;

said protective profile including an angle profile having a leg defining an outer surface of the stand, and a rear wall, said protective profile further including a sheet metal strip connected to the rear wall and running approximately parallel to said leg, wherein said angle profile is formed from a thicker material than said sheet-metal strip; and said stacking profile inserted into said protective profile and detachably secured to said sheet metal strip.

13. The stand as claimed in claim 12, wherein said protective profile has a U-shaped configuration and said stacking profile is inserted into said U-shaped configuration.

* * * * *